United States Patent
Alvarez-Troncoso et al.

(10) Patent No.: US 7,538,517 B2
(45) Date of Patent: May 26, 2009

(54) METHOD FOR DETECTING BATTERY STRATIFICATION

(75) Inventors: Ignacio Alvarez-Troncoso, Valls Tarragona (ES); Esteban Centellas Vela, Valls Tarragona (ES)

(73) Assignee: Lear Corporation, Southfield, MI (US)

(*) Notice: Subject to any disclaimer, the term of this patent is extended or adjusted under 35 U.S.C. 154(b) by 335 days.

(21) Appl. No.: 11/481,149

(22) Filed: Jul. 5, 2006

(65) Prior Publication Data
US 2008/0007225 A1    Jan. 10, 2008

(51) Int. Cl.
*H02J 7/00* (2006.01)
*G01N 27/416* (2006.01)
*H01M 10/48* (2006.01)

(52) U.S. Cl. .................... 320/132; 324/432; 429/91

(58) Field of Classification Search ........... 320/132, 320/134, 136, 135; 307/9.1, 10.1; 429/51, 429/61, 91, 104; 324/94, 432, 433, 434, 324/438, 425, 427, 439; 703/13
See application file for complete search history.

(56) References Cited

U.S. PATENT DOCUMENTS

| | | | |
|---|---|---|---|
| 5,550,474 A | * | 8/1996 | Dahl .................. 324/432 |
| 6,262,577 B1 | * | 7/2001 | Nakao et al. ........... 324/425 |
| 2002/0175657 A1 | * | 11/2002 | Leboe .................. 320/132 |
| 2003/0094321 A1 | * | 5/2003 | Hirata et al. ........... 180/65.2 |
| 2003/0094927 A1 | | 5/2003 | Pavlovic |
| 2005/0052158 A1 | * | 3/2005 | Meissner ............... 320/132 |
| 2005/0062458 A1 | * | 3/2005 | Koch et al. ............. 320/132 |
| 2005/0189920 A1 | | 9/2005 | Koch |
| 2007/0031725 A1 | | 2/2007 | Schulze-Beckinghausen |
| 2007/0065713 A1 | | 3/2007 | Rauchfuss |

* cited by examiner

*Primary Examiner*—Akm E Ullah
*Assistant Examiner*—M'Baye Diao
(74) *Attorney, Agent, or Firm*—MacMillan, Sobanski & Todd, LLC

(57) ABSTRACT

A method provided for detecting stratification within a vehicle battery. The method includes determining whether a state of charge of the vehicle battery is greater than a predetermined state of charge threshold. A determination is made whether a working capacity of the vehicle battery is greater than a working capacity threshold. A determination is made whether a voltage differential of the vehicle battery is greater than a predetermined voltage differential threshold. Stratification is detected within the vehicle battery in response to the state of charge, the working capacity, and the voltage differential being greater than the state of charge threshold, the working capacity threshold, the voltage differential threshold, respectively.

20 Claims, 3 Drawing Sheets

METHOD FOR DETECTING BATTERY STATIFICATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to battery monitoring systems, and more specifically, to a method to detect battery stratification.

2. Background of Related Art

Vehicle systems utilize a vehicle battery to initially provide electrical energy for starting the vehicle's powertrain system. After the start of the powertrain system, an alternator is utilized as a primary source of energy for providing electrical energy to various electrical devices of the vehicle which prevents drainage of energy from the vehicle battery. In addition, the alternator provides electrical energy to the vehicle battery for recharging the vehicle battery for maintaining a substantially maximum voltage.

The vehicle battery is an electrochemical device that produces and stores electricity. The battery produces a DC current that flows in only one direction. When the battery is discharged, the battery changes the chemical energy to electrical energy. When the battery is charging, the electrical energy is converted into chemical energy for storing energy until needed. The battery is recharged via the alternator once the engine is started. Discharging occurs during vehicle cranking where current is drawn from the battery, when the battery is not utilized for a prolonged period of time, and when loads from the vehicle are present that require more energy than that which the alternator can supply.

A battery includes a plurality of cells having a negative plate and a positive plate within a container immersed in an electrolyte (e.g., $SO_4H_2$—sulfuric acid and water). Battery plates are typically made of lead and lead oxide. The plates act as dissimilar metals.

Under normal conditions, the battery transforms the chemical energy into electrical energy by means of a chemical reaction between the electrolyte $SO_4H_2$ and the lead of the plates. During the energy conversion and discharge of electrical energy from the battery, the acid reacts with the lead of the plates to build up the lead sulfate ($SO_4Pb_2$) which can shorten the life of a battery if not removed. This reaction is reversible, meaning that the lead sulfate can be converted back to sulfuric acid and water if electrolyte solution is remixed. Remixing typically is performed by providing the battery with an increased battery charge.

When a load is connected across the terminals, there is a current flow of electrons to equalize the difference in the charges on the plates. Excess electrons flow from the negative plate to the positive plate. During this flow, the plates can be measured by the poles of the battery to determine the voltage. The voltage depends on the concentration of acid solution and the lead (Pb) content of the battery plates with respect to the other plates.

If the electrolyte solution is stratified, the acid is denser than the water and is being layered on the bottom of the battery. Under this condition, the acid concentration is light on the top of the solution and heavier on the bottom of the solution. The high acid concentration on the bottom artificially raises an open circuit voltage and the battery voltage appears to be fully charged and operable, but in reality, it has a low cold cranking amperage (CCA). CCA is defined as the amount of current available that the battery can deliver for defined duration of time (e.g., typically rated at 30 seconds) at cold temperatures (e.g., 0° F./−18° C.) while maintaining a terminal to terminal voltage of about 7.2 volts or 1.2 volts per cell.

If this battery stratification is not detected and not corrected, then the further battery usage will result in lower storage capacity and degradation of the battery cells, and thereafter, irreversible damage to the battery.

BRIEF SUMMARY OF THE INVENTION

The present invention has an advantage of providing an energy management algorithm for detecting stratification of the acid concentration in a vehicle battery. Corrective measure may also be provided to remix the acid in the battery by increasing the battery charge voltage if stratification is detected.

In one aspect of the invention, a method provided for detecting stratification within a vehicle battery. The method includes determining whether a state of charge of the vehicle battery is greater than a predetermined state of charge threshold. A determination is made whether a working capacity of the vehicle battery is greater than a working capacity threshold. A determination is made whether a voltage differential of the vehicle battery is greater than a predetermined voltage differential threshold. Stratification is detected within the vehicle battery in response to the state of charge, the working capacity, and the voltage differential being greater than the state of charge threshold, the working capacity threshold, the voltage differential threshold, respectively.

In yet another aspect of the invention, a method is provided for detecting stratification of acid concentration within a battery. An expected state of charge is calculated. A real state of charge is measured. The expected state of charge is modified by a first predetermined constant. A determination is made whether the real state of charge is less than the modified expected state of charge. A working capacity ratio is calculated between a differential working capacity and differential time. A determination is made whether the working capacity ratio is greater than a second predetermined constant. A nominal voltage is calculated. A real voltage is measured. The nominal voltage is modified by a third predetermined constant. A determination is made if the real voltage is less than the nominal voltage. Stratification is determined to be present within the battery in response to the real state of charge being less than the modified nominal state of charge, the working capacity ratio being greater than the second predetermined constant, and the real voltage being less than the modified voltage.

In yet another aspect of the invention, a method is provided for detecting stratification of acid concentration within a battery. A state of charge differential is calculated between an expected state of charge and a real state of charge. A determination is made whether the state of charge differential is greater than a predetermined state of charge threshold. A working capacity ratio is calculated between a differential working capacity and differential time. A determination is made whether the working capacity ratio is greater than a working capacity threshold. A voltage differential is calculated between a nominal voltage and a real voltage. A determination is made whether the voltage differential is greater than a predetermined voltage threshold. Stratification is determined to be present within the battery in response to satisfying the predetermined state of charge threshold, the working capacity threshold, and the predetermined voltage threshold, respectively.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
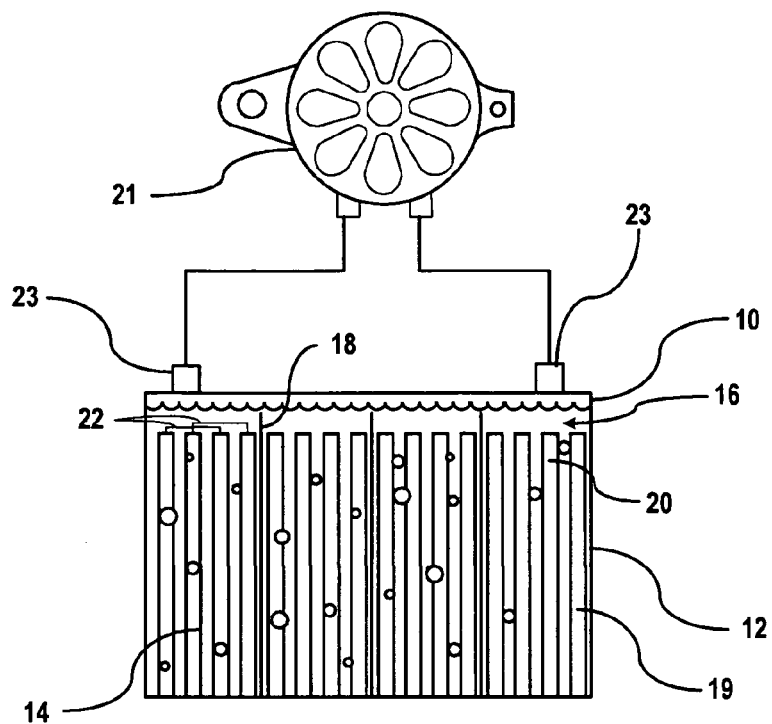
FIG. 1 is a schematic of a vehicle battery.

Referring now to the drawings, there is illustrated in FIG. 1 a battery 10 including a closed container 12, typically made from a non-corrosive material such as plastic, for holding an electrolyte solution 14. The electrolyte solution is preferably produced from sulfuric acid and water. The battery 10 includes a plurality of cells 16 with each respective cell being divided by a cell divider 18.

Each of the respective cells contains positive plates 19, negative plates 20, straps 22, and separators (not shown). The positive plates 19 are connected to one another by a first respective strap to form a positive plate group. Similarly, a second respective strap connects each of the negative plates 20 together to form a negative plate group.

The lead on the plates is porous (e.g., sponge-like) which allows the battery acid to penetrate the material of the plates which aids in the chemical reaction and production of electricity. The separators are made from an insulating material to keep the plates from contacting one another and shorting.

As the battery 10 is charged, a charging device 21 such as an alternator, a battery charger, or other charging device causes negative electrons to be deposited on the negative plates 20 which causes the negative plates 20 and positive plates 19 to have difference in potential (i.e., voltage). When a load is connected across the terminals 23, there is a current flow to equalize the difference in charges on the plates. The excess electrons move from the negative plate to the positive plate.

Figure 2:
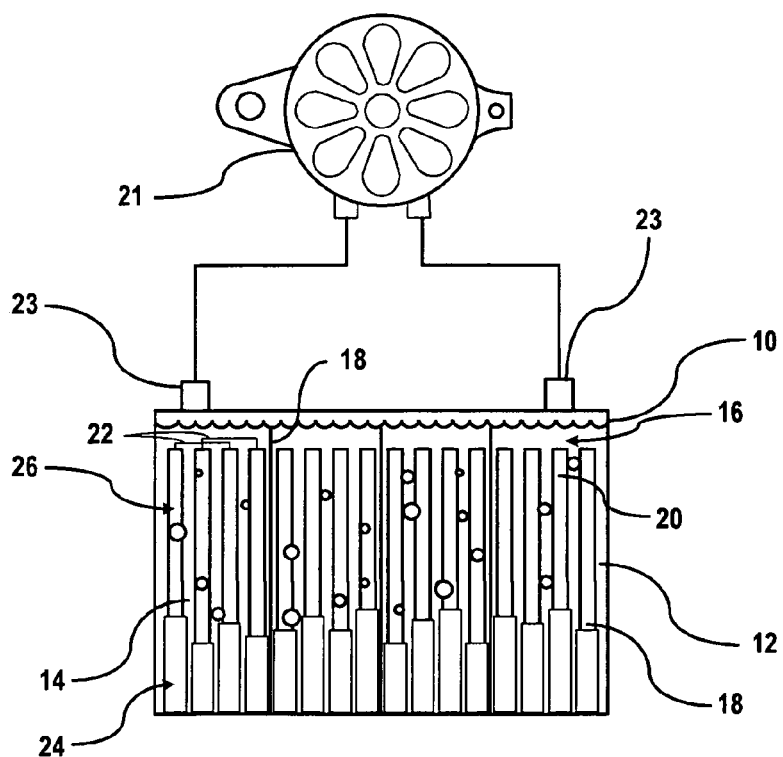
FIG. 2 is a schematic of a vehicle battery having a stratified acid concentration.

FIG. 2 illustrates a stratified battery. Battery stratification occurs when the acid concentration of the electrolyte solution 14 is heavier at the bottom portion 24 of the battery 10 than in the upper portion 26 of the battery 10. The higher concentration of acid at the bottom of the battery 10 causes additional build up of lead sulfate. As the lead sulfate increasingly builds in the battery and becomes hardened or crystallized (also known as sulfation), the storage capacity is reduced and degradation of the battery 10 will occur at a faster rate than normal resulting in irreversible damage to the internal components of the battery 10.

To determine if stratification is present within the battery 10, battery parameters are monitored for determining a state of charge (SOC) effect, a working capacity effect, and voltage effect which are thereafter compared to respective predetermined thresholds for identifying stratification within the battery 10, as discussed in more detail below.

Figure 3:
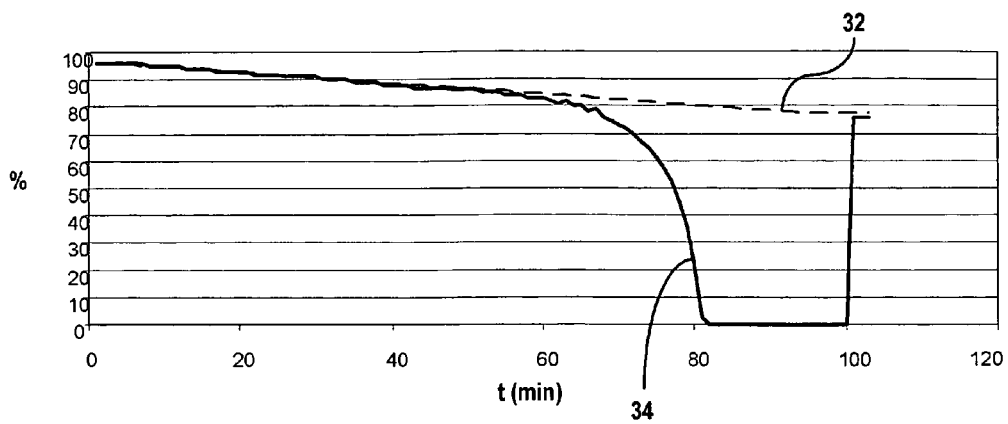
FIG. 3 is a graph of a state of charge comparison.

FIG. 3 illustrates a graph comparing an expected SOC with a real (i.e., measured) SOC of a respective battery. A SOC is typically defined as the relative remaining charge in a battery for current presently flowing therein. Line 32 represents the expected SOC whereas line 34 represents the real SOC. The expected SOC is represented by the following formula:

$$\Delta SOC_{expected} = \frac{\Delta Discharge}{Nominal\ Capacity} \cdot 100 \qquad (1)$$

where $\Delta Discharge$ is an integration of the incremental current that has exited the battery, and Nominal Capacity is the actual maximum quantity of charge that the battery can store, which is typically measured with battery fully charged and no current flowing.

The expected SOC is compared to the real SOC for satisfying a first condition for identifying the presence of stratification within the vehicle battery. The comparison is represented by the following formula:

$$\Delta SOC_{real} < (\Delta SOC_{expected})(a) \qquad (2)$$

where $\Delta SOC_{expected}$ is the expected $\Delta SOC$ calculated from eq. (1), the $\Delta SOC_{real}$ is measured directly from the battery, and "a" is a first predetermined constant. In summary, if $\Delta SOC_{real}$ is less than $\Delta SOC_{expected}$ (i.e., as modified by the first predetermined constant), then the first condition is satisfied. Alternatively, the first predetermined constant "a" may represent a predetermined state of charge threshold and the equation may be re-written so that the difference between the $\Delta SOC_{expected}$ and $\Delta SOC_{real}$ is greater than the predetermined state of charge threshold.

Figure 4:
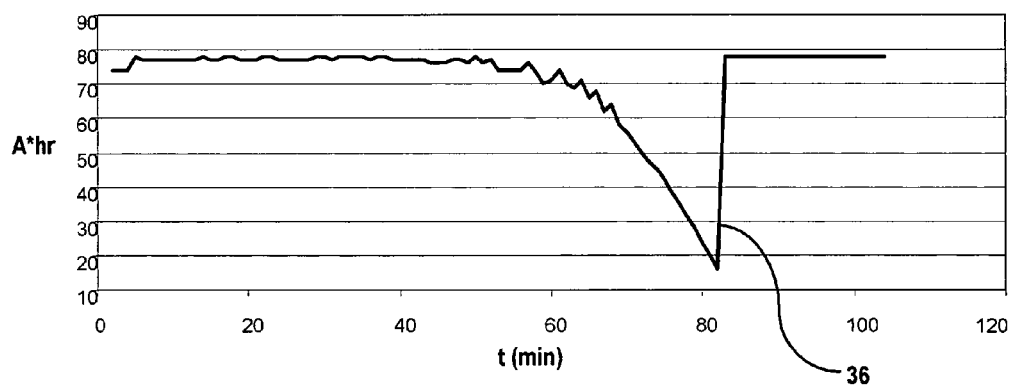
FIG. 4 is a graph of working capacity.

FIG. 4 illustrates a graph of the working capacity of the respective vehicle battery. Working capacity is typically defined as the maximum quantity of charge that the battery can supply at a given current flow and temperature (at a present battery status). The working capacity is equal to the nominal capacity when no current is flowing. Line 36 represents the working capacity for a respective vehicle battery. In a normal battery without stratification this parameter is generally constant, but in a stratified battery this parameter decreases significantly. The second condition, termed a working capacity ratio, is represented by the following formula:

$$\frac{-\Delta Working\ capacity}{\Delta t} > b \qquad (3)$$

where $\Delta Working\ capacity$ is the change in the working capacity between two points on line 36, $\Delta t$ is the change in time between the respective two points, and b is the second predetermined constant which defines the capacity slope that the algorithm detects.

When the working capacity ratio is greater than the second predetermined constant, the second predetermined condition is satisfied for identifying stratification within the vehicle battery.

Figure 5:
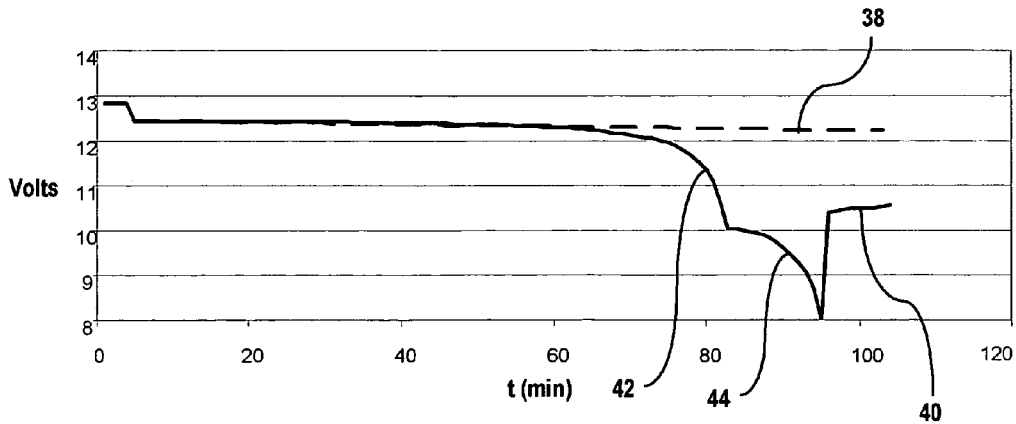
FIG. 5 is a graph of a voltage differential comparison.

FIG. 5 illustrates a graph of the battery voltage within the vehicle battery. Line 38 represents a nominal voltage whereas line 40 represents a measured voltage. A first voltage step is shown generally at 42 and a second voltage step is shown generally at 44. The first voltage step 42 begins decreasing at approximately 12.3 volts to approximately 10 volts of a first duration of time. The second voltage step 44 begins decreasing at approximately 10 volts and decreases to approximately 8 volts over a second duration of time. A third condition is satisfied for identifying stratification within the battery when the measured voltage differs from the nominal voltage by a predetermined voltage threshold. The nominal voltage is represented by the following formula:

$$V = (S)(\text{Discharge}) + (V_{100}) \quad (4)$$

where S is an internal battery parameter, Discharge is an integration of all current that has exited the battery, and $V_{100}$ is the battery voltage when the battery is 100% charged at no load. Modifying the formula and representing it in terms of S and incremental voltage changes and incremental discharge changes, the formula is now represented by:

$$S = \frac{\Delta V}{\Delta \text{discharge}} \quad (5)$$

where $\Delta V = V_i - V_{i-1}$, and $\Delta \text{Discharge} = \text{Discharge}_i - \text{Discharge}_{i-1}$.

The third condition, termed a voltage differential, is represented by the following formula:

$$S_{real} < (S_{nominal})(c) \quad (6)$$

where $S_{real}$ is the slope of the real voltage versus discharge, $S_{nominal}$ is the slope of the nominal voltage versus the cumulated discharge, and c is a third predetermined constant.

The third condition is satisfied when Sreal is less than $S_{nominal}$ (as modified by the third constant). That is, when the real voltage is less than the nominal voltage by a predetermined voltage threshold, the third condition is satisfied for identifying that stratification is present within the battery. Alternatively, the third predetermined constant c may represent a predetermined voltage differential threshold and the equation may be re-written so that the difference between the $S_{real}$ and $S_{nominal}$ is greater than the predetermined voltage differential threshold.

The three conditions for identifying stratification within the battery may be determined in any various order or may be determined concurrently. Stratification is determined to be present when the all three conditions are satisfied. The constants a, b, and c—which are factors that help calculate when the actual battery performance varies enough from the nominal to determine that a particular battery has a stratification concern—may be set according to the particular battery and vehicle in which the battery is employed, and the acceptable level of stratification that will be allowed to occur in that battery before a determination is made that stratification has reached an unacceptable level.

After the determination is made that the stratification is present within the battery, steps can then be taken to reverse the stratification process to reduce the chances that the lead sulfate will crystallize on the plates of the battery. The lead sulfate crystallization on the battery plates may cause permanent damage to the battery.

In FIG. 5, it is shown that the voltage falls to the first voltage step 42 and then to the second voltage step 44. The number of drop voltage steps depends on the stratification level. The stratification level is defined by the following formula:

$$\text{Stratification Level} = \frac{\text{Nominal voltage} - \text{Voltage step}}{\text{Nominal voltage}} \cdot 100 \quad (7)$$

Equation (6) can be modified and represented by the following:

$$\text{Stratification Level} = \frac{\text{Voltage drop}}{\text{Nominal voltage}} \cdot 100 \quad (8)$$

As seen by the above formula, the smaller the voltage drop, the smaller the stratification level will be. Similarly, the larger the voltage drop, the greater the stratification level is.

The stratification process may be reversed before sulfation occurs by utilizing an energy management operation such as re-mixing the electrolyte acid solution within the battery. The electrolyte acid solution may be re-mixed by charging the battery at an increased charge voltage—that is, a voltage above that which the alternator normally charges the battery. The charging process is performed by the alternator charging of the battery. The following formula provides the required voltage for re-mixing the solution given the current stratification level as determined by Eq. (8) and the nominal voltage supplied by the alternator for charging the battery:

$$V_{stratification} = (V_{charge})(\text{Stratification Level})(d) \quad (9)$$

where $V_{charge}$ is the voltage typically supplied by the alternator to the battery, and d is a fourth predetermined constant. The fourth predetermined constant d may be chosen based on the specific vehicle battery, the specific vehicle charging system requirements, the charge required to stir the acid concentration but lower than a desirable maximum limit, and other factors necessary or desirable for determination.

The voltage as determined from Eq. 9 is a voltage charge request that is provided to the vehicle charging system for recharging the battery at the increased charge voltage for remixing the electrolyte acid solution of the battery, which will help to reverse the build-up of lead sulfate on the plates of the battery. Preferably, re-charging of the battery may be performed immediately upon detecting that stratification is present within the battery. Alternatively, re-charging may be performed after the stratification has attained a predetermined stratification level or anytime before sulfation occurs.

Figure 6:
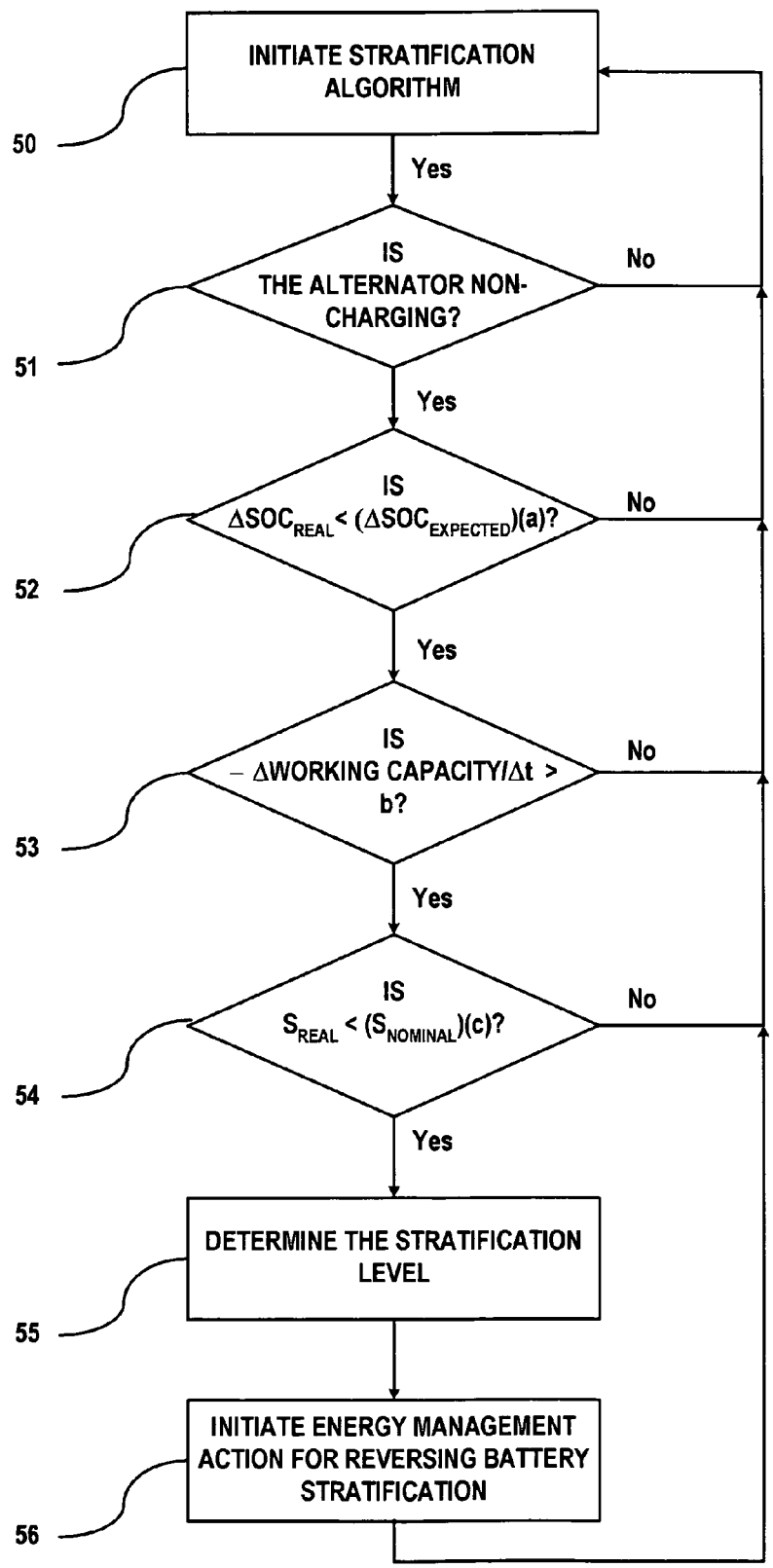
FIG. 6 is a flowchart of a method for detecting and correcting stratification within a battery.

FIG. 6 illustrates a method for detecting stratification of acid concentration within a battery and reversing the stratification. The stratification detection process will initiate when the alternator is in a non-charging mode. Preferably, this occurs when the engine is not operating. The initiation of the stratification detection process may begin upon the ignition key being in the key-on position without the engine running. This places necessary loads on the battery to have a flow of electrons from the negative plates to the positive plates so that the respective battery parameters may be measured. Alternatively, the stratification detection process may be initiated during an engine shut-off operation of the vehicle engine as the vehicle key is being turned from the engine run position to the engine off position. In yet another alternative method, the charging system may deactivate the power supply system from recharging the alternator to enter a non-charging mode.

In functional block 50, an energy management detection process is initiated. In decision block 51, a determination is made whether the alternator is in a non-charging mode. If the determination is made that the alternator is not within a non-charging mode, a return is made to functional block 50 to re-initiate the energy management detection process. If the determination was made in decision block 51 that the alternator is in a non-charging mode, then algorithm proceeds to decision block 52.

In decision block 52, a determination is made whether a real differential state of charge is less than an expected differential state of charge multiplied by the constant a. If a determination is made that the real differential state of charge is not less than the expected state of charge, then a return is made to functional block 50 to re-initiate the energy management detection process. If the determination in decision block 52 is that that the real differential state of charge is less than the expected differential state of charge, then the algorithm proceeds to decision block 53.

In decision block 53, a determination is made whether a working capacity ratio is greater than a working capacity threshold b. If the determination is made that the working capacity ratio is not greater than the working capacity threshold b, then a return is made to functional block 50 to re-initiate the energy management detection process. If the determination is made in decision block 53 that the working capacity ratio is greater, then the algorithm advances to decision block 54.

In decision block 54, a determination is made whether a real voltage is less than the nominal voltage multiplied by a predetermined voltage threshold c. This determination may be made by comparing the internal battery parameter S the real voltage and the nominal voltage. If the determination is made that the real voltage is not less than the nominal voltage, then a return is made to step 50 to re-initiate the energy management detection process. If the determination is made that the real voltage is less than the nominal voltage, then a determination is made that stratification is present within the battery and the algorithm advances to functional block 55. One will note that decision blocks 52, 53, and 54 can be accomplished in any order desired, or simultaneously.

In functional block 55, the stratification level is determined to be high enough to require reversing the stratification process. The algorithm may advance to optional functional block 56, or may provide some other means of notification or corrective action relating to the determination of a detrimental level of stratification.

In functional block 56, energy management actions are initiated where the stratification level is utilized to determine a voltage to be supplied to the battery to reverse the stratification process. The increased voltage recharging is preferably performed by the alternator within the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for detecting stratification within a vehicle battery, said method comprising the steps of:

determining whether a state of charge of said vehicle battery is greater than a predetermined state of charge threshold;

determining whether a working capacity of said vehicle battery is greater than a working capacity threshold;

determining whether a voltage differential of said vehicle battery is greater than a predetermined voltage differential threshold; and detecting stratification within said vehicle battery in response to said state of charge, said working capacity, and said voltage differential being greater than said state of charge threshold, said working capacity threshold, said voltage differential threshold, respectively.

2. The method of claim 1 further comprising the steps of applying an energy management action for reversing said stratification within said battery.

3. The method of claim 2 wherein said step of applying an energy management action comprises:

determining a stratification level; and applying an increased battery charge voltage to said battery as a factor of said stratification level for reversing stratification within said battery.

4. A method for detecting stratification of acid concentration within a battery, said method comprising the steps of:

(a) calculating an expected state of charge;

(b) measuring a real state of charge;

(c) modifying said expected state of charge by a first predetermined constant;

(d) determining whether said real state of charge is less than said modified expected state of charge;

(e) calculating a working capacity ratio between a differential working capacity and a differential time;

(f) determining whether said working capacity ratio is greater than a second predetermined constant;

(g) calculating a nominal voltage;

(h) measuring a real voltage;

(i) modifying said nominal voltage by a third predetermined constant;

(j) determining if said real voltage is less than said nominal voltage; and (k) determining stratification within said battery in response to satisfying conditions of said steps (d), (f), and (j).

5. The method of claim 4 further comprising the steps of:

determining a stratification level; and applying an increased battery charge voltage to said battery as a factor of said stratification level for reversing stratification within said battery.

6. The method of claim 5 wherein said increased battery charge voltage applied to said battery is represented by the following formula:

$$V_{stratification} = (V_{charge})(\text{Stratification Level})(d)$$

where $V_{charge}$ is a nominal voltage for charging said battery, Stratification Level is a calculated percentage between a voltage drop and said nominal voltage, and d is predetermined constant.

7. The method of claim 5 wherein said Stratification Level is represented by the formula:

$$\text{Stratification Level} = \frac{\text{voltage drop}}{\text{Nominal voltage}} (100)$$

where voltage drop is the difference between said nominal voltage and a voltage step.

8. The method of claim 5 wherein said step of applying an increased battery charge voltage to said battery is performed immediately upon detecting said stratification within said battery.

9. The method of claim 5 wherein said step of applying an increased battery charge voltage to said battery is performed prior to sulfation occurring in said battery.

10. The method of claim 5 wherein said step of applying an increased battery charge voltage to said battery is performed upon said stratification attaining a predetermined stratification level.

11. The method of claim 4 wherein detecting said stratification within said battery is performed during a non-charging battery operation.

12. The method of claim 4 wherein detecting said stratification with said battery is performed after an ignition key-on operation and prior to an engine crank operation.

13. The method of claim 4 wherein detecting said stratification within said battery is performed immediately after an engine off operation.

14. A method for detecting stratification of acid concentration within a battery, said method comprising the steps of:
   (a) calculating a state of charge differential between an expected state of charge and a real state of charge;
   (b) determining whether the state of charge differential is greater than a predetermined state of charge threshold;
   (c) calculating a working capacity ratio between a differential working capacity and differential time;
   (d) determining whether said working capacity ratio is greater than a working capacity threshold;
   (e) calculating a voltage differential between a nominal voltage and a real voltage;
   (f) determining if said voltage differential is greater than a predetermined voltage threshold; and
   (g) determining stratification within said battery in response to said step (b), (d), and (f) satisfying said predetermined state of charge threshold, said working capacity threshold, and said predetermined voltage threshold, respectively.

15. The method of claim 14 further comprising the steps of:
   determining a stratification level; and
   applying an increased battery charge voltage to said battery as a factor of said stratification level for reversing stratification with said battery.

16. The method of claim 15 wherein said step of applying an increased battery charge voltage to said battery is performed immediately upon detecting said stratification within said battery.

17. The method of claim 15 wherein said step of applying an increased battery charge voltage to said battery is performed prior to sulfation occurring in said battery.

18. The method of claim 14 wherein detecting said stratification within said battery is performed during a non-charging battery operation.

19. The method of claim 14 wherein detecting said stratification with said battery is performed after an ignition key-on operation and prior to an engine crank operation.

20. The method of claim 14 wherein detecting said stratification within said battery is performed immediately after an engine-off operation.

* * * * *